US010684145B2

United States Patent
Müller et al.

(10) Patent No.: US 10,684,145 B2
(45) Date of Patent: Jun. 16, 2020

(54) SENSOR PATCH AND METHOD FOR PRODUCING A SENSOR PATCH

(71) Applicant: FOS4X GMBH, München (DE)

(72) Inventors: Mathias Müller, München (DE); Fabian Zelenka, München (DE)

(73) Assignee: FOS4X GMBH, München (DE)

( * ) Notice: Subject to any disclaimer, the term of this patent is extended or adjusted under 35 U.S.C. 154(b) by 155 days.

(21) Appl. No.: 15/761,152

(22) PCT Filed: Sep. 20, 2016

(86) PCT No.: PCT/EP2016/072308
§ 371 (c)(1),
(2) Date: Mar. 19, 2018

(87) PCT Pub. No.: WO2017/050766
PCT Pub. Date: Mar. 30, 2017

(65) Prior Publication Data
US 2018/0259371 A1 Sep. 13, 2018

(30) Foreign Application Priority Data
Sep. 21, 2015 (DE) .................. 10 2015 115 927

(51) Int. Cl.
*G01D 5/353* (2006.01)
*G01L 1/24* (2006.01)
*G01M 5/00* (2006.01)

(52) U.S. Cl.
CPC .......... *G01D 5/35316* (2013.01); *G01L 1/246* (2013.01); *G01M 5/0025* (2013.01); *G01M 5/0091* (2013.01)

(58) Field of Classification Search
CPC .... G02B 6/0218; G02B 6/022; G02B 6/3616; G01M 5/0091; G01L 1/246
See application file for complete search history.

(56) References Cited

U.S. PATENT DOCUMENTS 5,694,503 A * 12/1997 Fleming ............... G02B 6/0218
385/37
6,393,181 B1    5/2002 Bulman et al.
(Continued)

FOREIGN PATENT DOCUMENTS

CN        1250516 A     4/2000
CN     101298980 A    11/2008
(Continued)

OTHER PUBLICATIONS

German Examination Report dated May 2, 2016 for Application No. 10 2015 115 927.9.
(Continued)

*Primary Examiner* — Thanh Luu
(74) *Attorney, Agent, or Firm* — Moser Taboada

(57) ABSTRACT

A sensor patch (110) is provided that includes a light guide (112) having a sensor element (111). Further, the sensor patch (110) includes a carrier structure having a first fastening element (301) for fastening the light guide (112) at a first position (401), and a second fastening element (302) that is spaced apart from the first fastening element (302) for fastening the light guide at a second position (402), wherein the sensor element (111) is arranged between the first position (401) and the second position (402), an intermediate carrier (500) having a first surface (503), on which the first and second fastening elements (301, 302) are mounted at respective fastening positions (501 502), and an opposing second surface (504) that can be mounted on a measurement object, and a covering element (303) arranged on the intermediate carrier (500) and connected thereto. The covering element (303) has together with the intermediate carrier (500) a cross-sectional dimension, which is oriented approximately perpendicular to a longitudinal extension of
(Continued)

the light guide (112), in such a way that the light guide (112) extends in the neutral fiber (900) of the sensor patch (110).

17 Claims, 6 Drawing Sheets

(56) References Cited

U.S. PATENT DOCUMENTS

| | | | |
|---|---|---|---|
| 6,510,272 | B1 | 1/2003 | Wiegand |
| 2007/0193362 | A1 | 8/2007 | Ferguson |
| 2012/0132008 | A1* | 5/2012 | Way .................. G01L 1/246 73/800 |

FOREIGN PATENT DOCUMENTS

| | | |
|---|---|---|
| DE | 19922102 A1 | 12/2000 |
| DE | 69837752 T2 | 10/2007 |
| DE | 102013205205 A1 | 10/2014 |
| EP | 1679497 A1 | 7/2006 |
| EP | 1816432 A1 | 8/2007 |
| EP | 2295946 A1 | 3/2011 |
| GB | 2421075 A | 6/2006 |
| WO | WO-0120377 A1 | 3/2001 |
| WO | WO-0135133 A1 | 5/2001 |

OTHER PUBLICATIONS

International Search Report and Written Opinion dated Dec. 5, 2016 for PCT Application No. PCT/EP2016/072308.
China National Intellectual Property Administration Search Report on application No. 201680054371.5 dated Nov. 25, 2019.
Chinese First Action on application No. 201680054371.5 dated Dec. 4, 2019.

* cited by examiner

SENSOR PATCH AND METHOD FOR PRODUCING A SENSOR PATCH

TECHNICAL FIELD

Embodiments of the present invention generally concern sensor units capable of being mounted to a measurement object to be monitored, and concern in particular a sensor patch in which a fiber optic sensor is incorporated. Embodiments of the present invention furthermore concern a method for producing a sensor patch.

BACKGROUND ART

Sensor units capable of being mounted to a measurement object to be monitored such as, for instance a rotor blade of a wind turbine, are in general built as patches including relevant sensor elements for detecting the measurement parameter of interest. In this context, fiber optic sensors play an important role, since these, due to the optical transmission of measurement signals via a light guide, are substantially insusceptible to external influences such as electromagnetic fields and provide for a fast data transmission. Furthermore, fiber optic sensors exhibit good electromagnetic compatibility (EMC), In fiber optic sensors, the measurement signal derived from the measurement parameter is optically transmitted by means of a light guide. Fiber optic sensors may in this case be designed as extrinsic sensors in which the light guide merely serves to transport the optical radiation. The design of fiber optic sensors as intrinsic sensors is further widely spread, in which the sensor element such as a fiber Bragg grating (FBG), for example, is contained in the sensor fiber itself.

An intrinsic fiber optic sensor is sensitive to mechanical structural changes such as, for instance elongation and/or compression, as well as to temperature variations. For measuring a parameter to be detected, the sensor unit or the fiber optic sensor element is appropriately connected to the measurement object, wherein undesired influences need to be compensated and measuring sensitivities be set. It is therefore desirable to further improve sensor patches having fiber optic sensors.

SUMMARY OF THE INVENTION

According to an embodiment, a sensor patch is provided including a light guide having at least one fiber optic sensor element, a carrier structure having a first fastening element for fastening the light guide at a first position, and a second fastening element that is spaced apart from the first fastening element for fastening the light guide at a second position, wherein the fiber optic sensor element is arranged between the first position and the second position, an intermediate carrier having a first surface on which the first and second fastening elements are mounted at respective fastening positions, and an opposite second surface that can be mounted on a measurement object, and a covering element arranged on the intermediate carrier and connected thereto, which together with the intermediate carrier forms a cross-sectional dimension that is oriented approximately perpendicular to a longitudinal extension of the light guide in such a way that the light guide extends in the neutral fiber of the sensor patch.

According to a further embodiment, a method for producing a sensor patch is provided. The production method includes the operations of providing a carrier structure having a first and a second fastening element, laying a light guide between the first and second fastening elements, fastening the light guide to the fastening elements, pretensioning the light guide by means of an elastic element arranged between the fastening elements, attaching the carrier structure to an intermediate carrier, and covering the carrier structure with a covering element in such a way that the light guide extends in the neutral fiber of the sensor patch.

BRIEF DESCRIPTION OF THE DRAWINGS

Exemplary embodiments are illustrated in the drawings and explained in more detail in the following description.

In the drawings, identical reference symbols designate identical or functionally identical components or blocks.

WAYS TO CARRY OUT THE INVENTION

Figure 1A:
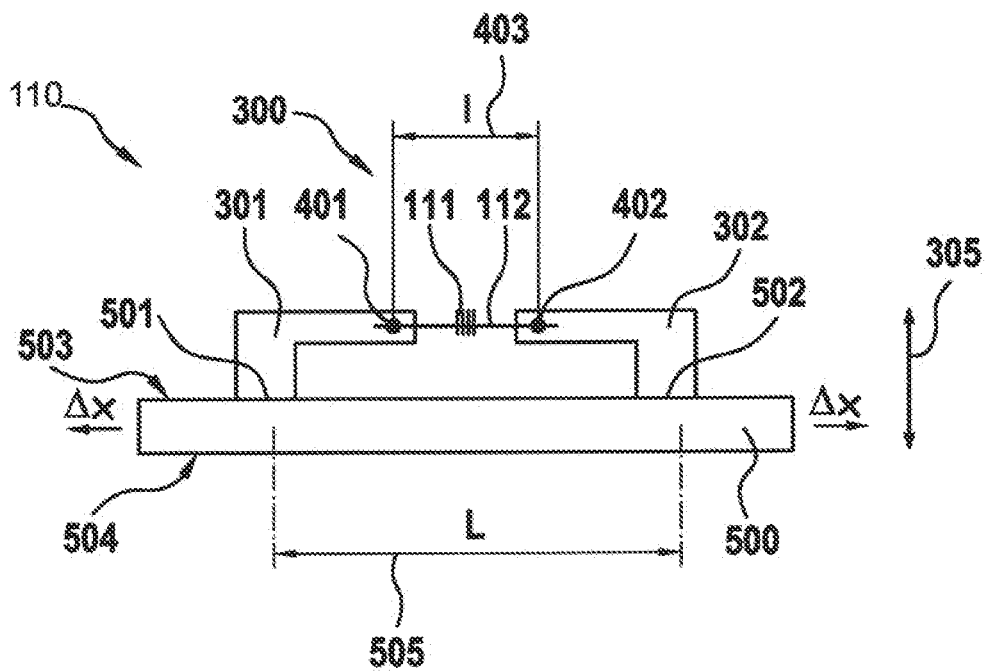
FIG. 1A schematically shows a sensor patch having a fiber optic sensor element in a cross-sectional view according to one embodiment.

Hereinafter, detailed reference is made to various embodiments of the invention, with one or more examples being illustrated in the drawings.

FIG. 1A schematically shows a sensor patch 110 having a fiber optic sensor element 111 in a cross-sectional view according to one embodiment. Furthermore, a clamping device 300 for a light guide 112 is schematically illustrated in FIG. 1A. The clamping device 300 includes a carrier structure which has a first fastening element 301 for fastening the light guide 112 at a first position 401, and a second fastening element 302 spaced apart from the first fastening element 301 for fastening the light guide 112 at a second position 402. Between the two positions 401, 402, the light guide 112 includes a sensor element 111. According to an embodiment which can be combined with other embodiments described herein, the sensor element 111 is designed as a fiber Bragg grating. The carrier structure of the clamping device 300 is in particular configured for receiving a light guide 112, which includes at least one fiber Bragg grating that can be positioned between the fastening elements 301, 302. It should be noted that the sensor element 111 is arranged within the light guide 112 in the form of an intrinsic sensor and is not shown true to scale in FIG. 1A.

According to an embodiment which can be combined with other embodiments described herein, the carrier structure may contain a material which is selected form the group consisting of CFRP, steel, aluminum, an alloy, GFRP, or any combination thereof.

According to an embodiment which can be combined with other embodiments described herein, at least one of the fastening elements 301, 302 includes a recess for inserting and fixing the light guide 112. According to another embodiment, the light guide 112 is adhesively bonded to the fastening elements 301, 301 at the fastening positions 401, 402.

The first and second positions 401, 402, where the light guide 112 is attached to the first fastening element 301 and the second fastening element 302, respectively, have a first distance 403 in a longitudinal extension of the light guide 112. Furthermore, an intermediate carrier 500 having a first surface 503, to which the first and second fastening elements 301, 302 are attached at respective fastening positions 501, 502, and an opposing second surface 504 is provided, which can be attached to a measurement object (not shown).

According to a further embodiment which can be combined with embodiments described herein, the carrier structure is realized from a metallic material. According to an even further embodiment, the intermediate carrier 500 is realized from GFRP or CFRP. A material combination of the material of the intermediate carrier 500 and the material of the fastening elements 301, 302 may in particular be selected so as to achieve a temperature compensation. According to an even further embodiment which can be combined with other embodiments described herein, the first distance 403, the second distance 505, a material of the carrier structure and a material of the intermediate carrier 500 are selected such that a passive temperature compensation is provided for a fiber optic sensor element 111 fastened to the carrier structure.

Furthermore, it is possible for the thermal expansion coefficient of the carrier structure and the thermal expansion coefficient of the intermediate carrier 500 to be configured or adapted to one another such that the passive temperature compensation is provided for a fiber optic sensor patch 110 fastened to the carrier structure. In this way, the advantage of compensating a thermal expansion of the intermediate carrier 500 at least in part by a thermal expansion of the carrier structure is achieved. In other words, a temperature compensation is provided by an embodiment which can be combined with other embodiments described herein, which results in the first distance 403 remaining substantially constant upon a change in temperature.

Although only a single sensor element 111 is shown in FIG. 1A, it should be understood that the present invention is not restricted to a data acquisition from a single sensor element 111, but that a plurality of sensor elements 111 may be arranged along the light guide 112. FIG. 1A thus shows only a portion of the optical waveguide which may be formed as a sensor fiber, optical fiber or light guide 112. Such a sensor element 111 is sensitive, for instance, to a fiber elongation and/or a fiber compression (see arrows Δx in FIG. 1A). Optical radiation entering the light guide 112 thus is reflected from the sensor element 111 at a changed course of wavelength. Such a changed course of wavelength is dictated by the mechanical load of the sensor element 111 as well as by temperature effects.

According to an embodiment which can be combined with other embodiments described herein, the second distance 505 of the fastening positions 501, 502 of the fastening elements 301, 302 on the intermediate carrier 500 is greater than the first distance 403 in a longitudinal direction of the light guide 112. In this way, a converter structure is provided which has a mechanical signal amplification arrangement that is free from lever action. Such a signal amplification will be explained in the following with reference to FIG. 1A. It should be assumed that the intermediate carrier 500 mounted to a measurement object expands together with the measurement object in a direction shown by arrows Δx. In this case, the relative change in length E of the intermediate carrier 500 in relation to the second distance 505 or L, respectively, is given by the following equation:

$$E = \Delta x / L \quad (1)$$

The sensor element 111 moreover expands together with the light guide 112 between the first position 401 and the second position 402 at a relative change of length ε according to the following equation:

$$\varepsilon = \Delta x / I \quad (2)$$

Using the above equations (1) and (2), the relative elongation ε detected by the sensor element 111 results in:

$$\varepsilon = E(L/I) \quad (3)$$

In this way, the relative elongation applied to the measurement object is increased by the factor (L/I) so that a signal amplification or a mechanical signal amplification arrangement without any lever action is provided by such a converter structure. This means that the relative change in length ε applied to the sensor element 111 is greater than the relative change in length E applied to the intermediate carrier 500. This enables the measuring resolution to be considerably improved. It should be pointed out that the signal amplification described above is also applicable vice versa to compressions of the intermediate carrier 500 by the measurement object. In particular, the fastening elements 301, 301 together with the intermediate carrier 500 form a converter structure which has a mechanical signal amplification arrangement free from lever action and can be set on the basis of the variables I and L.

According to a further embodiment which can be combined with other embodiments described herein, the converter structure having the set mechanical signal amplification arrangement free from lever action may be configured such that a passive temperature compensation will ensue together with the thermal expansion coefficients of the materials of the carrier structure in particular when the clamping device 300 is applied to the measurement object to be monitored.

According to a further embodiment which can be combined with other embodiments described herein, a sensor fiber or the light guide 112 may be led away relative to the longitudinal direction of the light guide 112 at an angle to an evaluating unit (not shown in FIG. 1A). In particular, a unilateral lead-away of the light guide 112 may be performed via a robust cable. In order to avoid reflections at the other end of the light guide 112, a terminator may be provided that is mounted at a side of the sensor element 111 opposite the lead-away.

By providing the intermediate carrier 500 with the option of an extensive application to a measurement object to be monitored, the object elongation thereof is averaged over a larger range. This has the advantage that discontinuities in the material of the measurement object can be compensated.

Furthermore, it is simply possible to apply the intermediate carrier 500 together with the entire sensor patch 110 to the measurement object by adhesive bonding.

Depending on the design of the intermediate carrier 500 and/or of the first and second fastening elements 301, 302, an adjustable sensor height 305 will be obtained. According to a further embodiment which can be combined with embodiments described herein, the mounting of the carrier structure to the intermediate carrier 500 and/or the mounting of the intermediate carrier 500 to the measurement object to be monitored may be performed by adhering, soldering, bonding or laser welding.

Figure 1B:
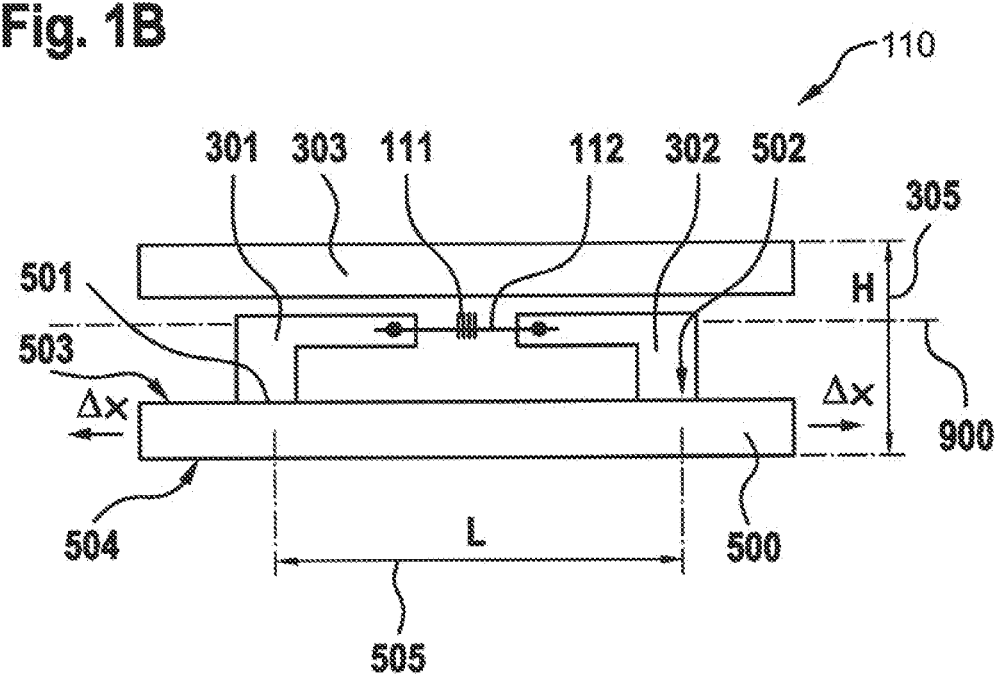
FIG. 1B schematically shows the sensor patch illustrated in FIG. 1A with an additional covering element, with the extension of the neutral fiber being indicated, according to one embodiment.

FIG. 1B schematically shows the sensor patch 110 illustrated in FIG. 1A with an additional covering element 303, with the extension of the neutral fiber 900 being indicated, according to one embodiment. According to one embodiment which can be combined with other embodiments described herein, the covering element 303 is realized from an elastic material selected from the group consisting of rubber, GFRP, plastics, CFRP and any combination thereof.

According to an embodiment which can be combined with other embodiments described herein, a sensor patch 110 is thus provided including a light guide 112 having a sensor element 111. The sensor patch 110 further includes a carrier structure having a first fastening element 301 for fastening the light guide 112 at a first position 401, and a second fastening element 302 spaced apart from the first fastening element 301 for fastening the light guide 112 at a second position 402, wherein the sensor element 111 is arranged between the first position 401 and the second position 402, an intermediate carrier 500 having a first surface 503, to which the first and second fastening elements 301, 302 are attached at respective fastening positions 501, 502, and an opposing second surface 504, which can be attached to a measurement object, and a covering element 303 arranged on the intermediate carrier 500 and connected thereto. Together with the intermediate carrier 500, the covering element 303 forms a cross-sectional dimension that is oriented approximately perpendicular to a longitudinal extension of the light guide 112 in such a way that the light guide 112 extends in the neutral fiber 900 of the sensor patch 110.

It should be pointed out that, although not shown in FIG. 1B, the sensor patch 110 forms a compact unit. That means that the intermediate carrier 500 is in mechanically rigid connection with the covering element 303 and further components of the sensor patch 110. The neutral fiber 900 can be defined in such a compact structure. The neutral fiber 900 is that layer of a beam cross-section, the length of which does not change in a bending process. In other words, bending of the structure does not cause neither tensile nor compressive stresses along the neutral fiber 900. Thus, the neutral fiber 900 runs through the geometric center of gravity of the cross-sectional area of the sensor patch 110. The adjustment of the position of the neutral fiber 900 within the structure of the sensor patch 110 will be explained in detail below with reference to FIG. 2B.

If, for example, the axis of the light guide 112 is placed in the zone of the neutral fiber 900, as shown in FIG. 1B, the bending of the sensor patch 110 will generate no or only a slight measurement signal from the fiber optic sensor element 111. In this way, the advantage is obtained that due to the arrangement of the light guide 112 together with the fiber optic sensor element 111, an almost complete insensitivity to a bending of the sensor patch 110 is provided in the neutral fiber 900 of the entire patch assembly, for instance, when installed on uneven measurement object surfaces.

In order to be able to mount a sensor patch as shown in FIG. 1B particularly easily to a rotor blade of a wind turbine, it is advantageous for the sensor patch in a cross-section perpendicular to the light guide 112 in FIG. 1B to have a small dimension 305 or a low height H above the measurement object to be monitored. A maximum dimension 305 in a cross-section perpendicular to the axis of the light guide 112 may be 10 mm or less, for example. The configuration as shown with respect to FIG. 1B allows such a dimensioning to be realized in a simple manner.

In order to obtain a sensor patch 110 as shown in FIG. 1B for measuring elongations and/or compressions and/or temperatures of a measurement object to be monitored, a corresponding production method is provided according to embodiments described herein. The method includes the operation of providing a carrier structure having a first and a second fastening element 301, 302, laying a light guide 112 between the first and second fastening elements 301, 302, fastening the light guide 112 to the fastening elements 301, 302, pretensioning the light guide 112 by means of an elastic element 506 arranged between the fastening elements 301, 302, attaching the carrier structure to an intermediate carrier 500, and covering the carrier structure with a covering element 303 in such a way that the light guide 112 extends in the neutral fiber 900 of the sensor patch 110.

Figure 2A:
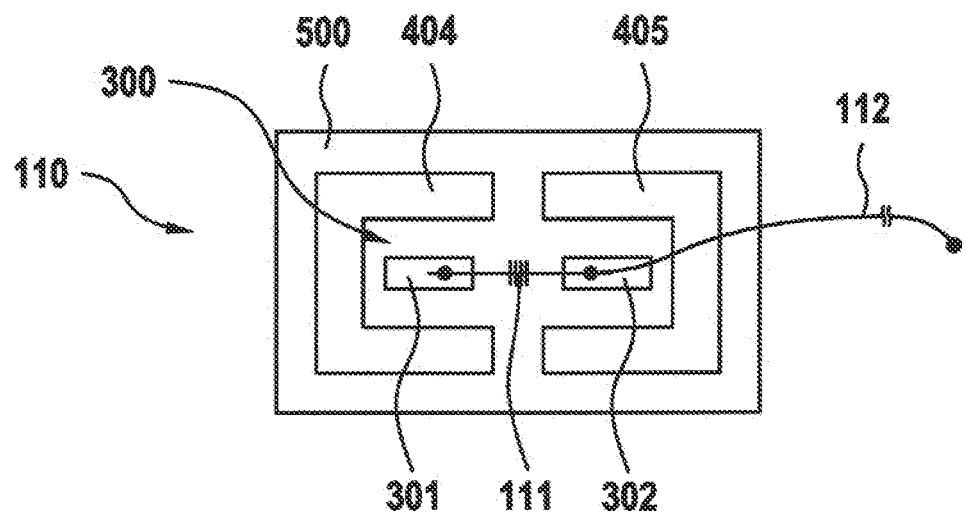
FIG. 2A shows a sensor patch in a top view without a covering element, according to one embodiment.

FIG. 2A shows a sensor patch 110 in a top view without covering element, according to one embodiment. The sensor patch 110 is suitable for measuring elongations and/or compressions and/or temperatures of a measurement object to be monitored. The sensor patch 110 includes the light guide 112 having a fiber Bragg grating 111, wherein the light guide 112 is clamped in a clamping device 300 illustrated in FIG. 1A. The clamping device 300 illustrated in FIG. 1A is shown in a top view. At least one end of the light guide 112 will be connected to an evaluating unit 114 described further below with reference to FIG. 6 for measuring. It should be pointed out that, apart from an evaluation of the light reflected by the sensor element 111, the light transmitted through the sensor element 111 may be analyzed in the evaluating unit 114.

Further, two connecting elements, i.e. a first connecting element 404 and a second connecting element 405 are shown in FIG. 2A. The connecting elements 404, 405 contribute to a structural, mechanically rigid connection between the intermediate carrier 500 and the covering element 303 (not shown in FIG. 2A) placed on top of the connecting elements 404, 405. It should be pointed out that instead of the two connecting elements 404, 405 only one connecting element or more than two connecting elements could be used for forming the structure of the sensor patch 110.

According to a further embodiment which can be combined with other embodiments described herein, at least one connecting element 404, 405, 406 may have a cavity in which the carrier structure for the light guide 112 is arranged.

According to a further embodiment which can be combined with other embodiments described herein, a connecting structure for mechanically connecting the covering element 303 and the intermediate carrier 500 may be formed from two opposing U profiles such that a hollow space is provided, in which the carrier structure may be accommodated, see FIG. 2A.

According to an even further embodiment which can be combined with other embodiments described herein, the intermediate carrier 500, the carrier structure for the light guide 112 and/or at least one connecting element 404, 405, 406 and/or the covering element 303 may form a monolithic unit. Thus, the advantage is achieved that a compact structure is provided for the sensor patch 110, wherein the neutral fiber 900 is defined within the structure.

Figure 2B:
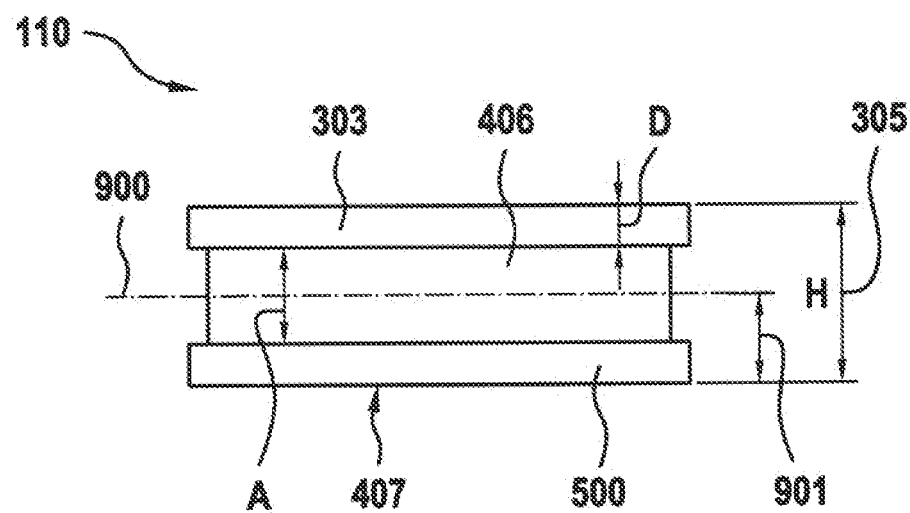
FIG. 2B shows a sensor patch with a covering element and a connecting element in a side view according to one embodiment.

FIG. 2B shows a sensor patch 110 with a covering element 303 and a connecting element 406 in a side view according to one embodiment. The sensor patch 110 is attached to a measurement object to be monitored by a connecting surface 407 for performing measurement. According to an embodiment which can be combined with other embodiments described herein, the attaching of the intermediate carrier 500 by the connecting surface 407 to the measurement object to be monitored may be performed by adhering, soldering, bonding or laser welding.

The connecting element 406 contributes to a structural, mechanically rigid connection between the intermediate carrier 500 and the covering element 303 placed on top of the connecting element 406. In accordance with the material properties and the material thicknesses of the elements 500, 406 and 303, the position of the neutral fiber 900 in the sensor patch 110 is defined, i.e. the position 901 of the neutral fiber 900 is determined by a design of the components of the sensor patch 110. In other words, covering the carrier structure by the covering element 303 is performed such that the light guide 112 extends in the neutral fiber 900 of the sensor patch 110.

A setting of the position of the neutral fiber 900 within the sensor patch 110 may be provided according to a further embodiment which can be combined with other embodiments described herein, as follows. A thickness D of the covering element 303 and/or a distance A of the covering element 303 from the intermediate carrier 500 and/or the material properties of the covering element 303 and/or of the intermediate carrier 500 and/or of the connecting element 406 may be selected such that the light guide 112 extends in the neutral fiber of the sensor patch 110. According to an embodiment which can be combined with other embodiments described herein, a setting of the position of the neutral fiber in the sensor patch may be achieved by adapting or adjusting one of the parameters mentioned above, in particular the thickness D.

In order to provide a sensor patch 110 as shown, for instance, in FIG. 1B, particularly easily on a rotor blade, in particular in an outer radial area, it is advantageous for the sensor patch 110 to have a small dimension 305 in a cross-section perpendicular to the light guide 112 in FIG. 1B. A maximum dimension 305 in a cross-section perpendicular to the axis of the light guide 112 may be 10 mm or less, for instance. The configuration shown with respect to FIG. 1 allows such a dimensioning to be realized in a simple manner.

Figure 3A:
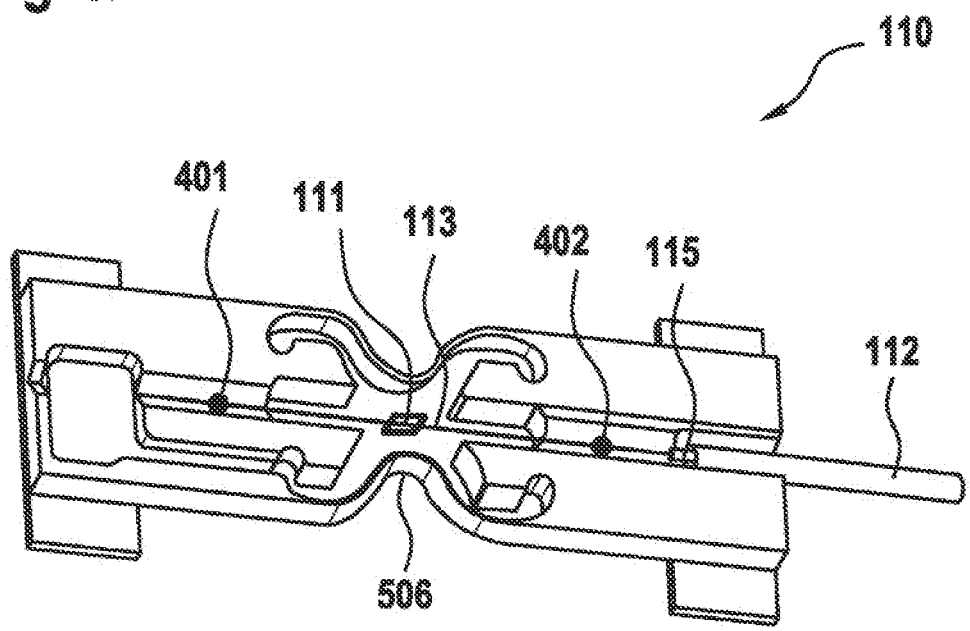
FIG. 3A schematically shows parts of a clamping device for a light guide in a perspective view at an oblique angle from above.
Figure 3B:
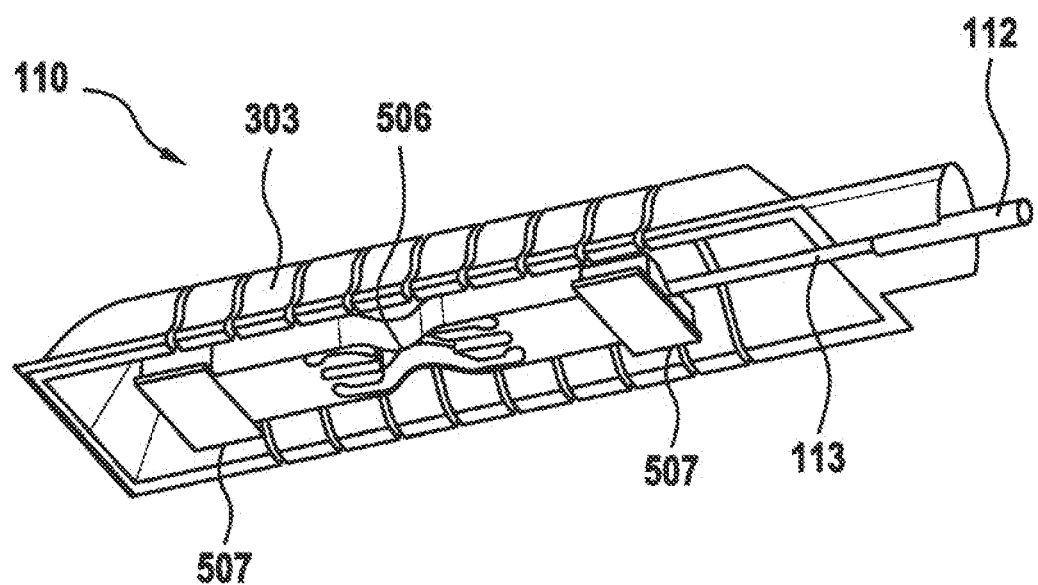
FIG. 3B schematically shows parts of a clamping device for a light guide with an attached covering element and an inserted light guide in a perspective view at an oblique angle from below.

FIGS. 3A and 3B show further views of parts of a fiber optic sensor 110 from different angles of view for clarifying a typical embodiment. FIG. 3A schematically shows a carrier structure for alight guide 112 in a perspective view at an oblique angle from above, and FIG. 3B schematically shows a carrier structure for alight guide 112 with an attached covering element 303 and an inserted light guide 112 in a perspective view at an oblique angle from below, that is from the side where the measurement object is mounted when the sensor is in operation. The provision of the covering element 303 achieves the advantage that the fiber optic sensor element 111 as well as the carrier structure are protected against damage. According to an embodiment, the carrier structure is provided between an intermediate carrier (not shown in FIGS. 3A and 3B) and the covering element 303. Thus, the mounted covering element 303 offers protection against external force effects, in particular a step protection. According to a further embodiment which can be combined with embodiments described herein, a layer of soft rubber is further applied to the covering element 303 for protecting the fiber optic sensor 110 against environmental influences.

The light guide 112 includes a light guide core 113 including the sensor element 111 formed, for instance as a fiber Bragg grating, and a light guide sheath 115. According to embodiments which can be combined with other embodiments described herein, the carrier structure further includes at least one elastic element 506 such as a spring, arranged between the first and second fastening elements 301, 302 and configured to pretension a light guide 112 secured to the fastening elements 301, 302 or the first and second positions 401, 402 in its longitudinal direction. As illustrated in FIG. 3A, the carrier structure may include the elastic element 506. Thus, it is possible to detect fiber compressions apart from fiber elongations by means of optical signals. In other words, the advantage is achieved that the elastic element 506 pretensions a fiber Bragg grating attached to the carrier structure in such a manner that the grating detects both elongations and compressions. Due to the achieved pretensioning of the light guide 112 together with the fiber optic sensor element 111, it is therefore possible to detect positive and negative elongations. The pretensioning of the optical sensor fiber moreover enables a state to be detected, in which a fiber is broken or has detached from the fastening points 401, 402 at one or both of the fastening elements 301, 302. Such a pretensioning of the light guide 122 accordingly enables in an advantageous manner both a compression and detaching of the light guide 112 from a fastening element 301, 302 to be detected.

According to further embodiments which can be combined with embodiments described herein, the carrier structure may be realized in one piece together with the elastic element 506.

As illustrated in FIG. 3B, the carrier structure includes surfaces 507, i.e. connecting surfaces to the intermediate carrier 500, that can be attached to the intermediate carrier 500. Such an attachment may be an adhesive connection or a soldered connection, for example. The surfaces 507 coincide with the first and second fastening positions 501, 502 shown in FIGS. 1A and 1B.

Figure 4:
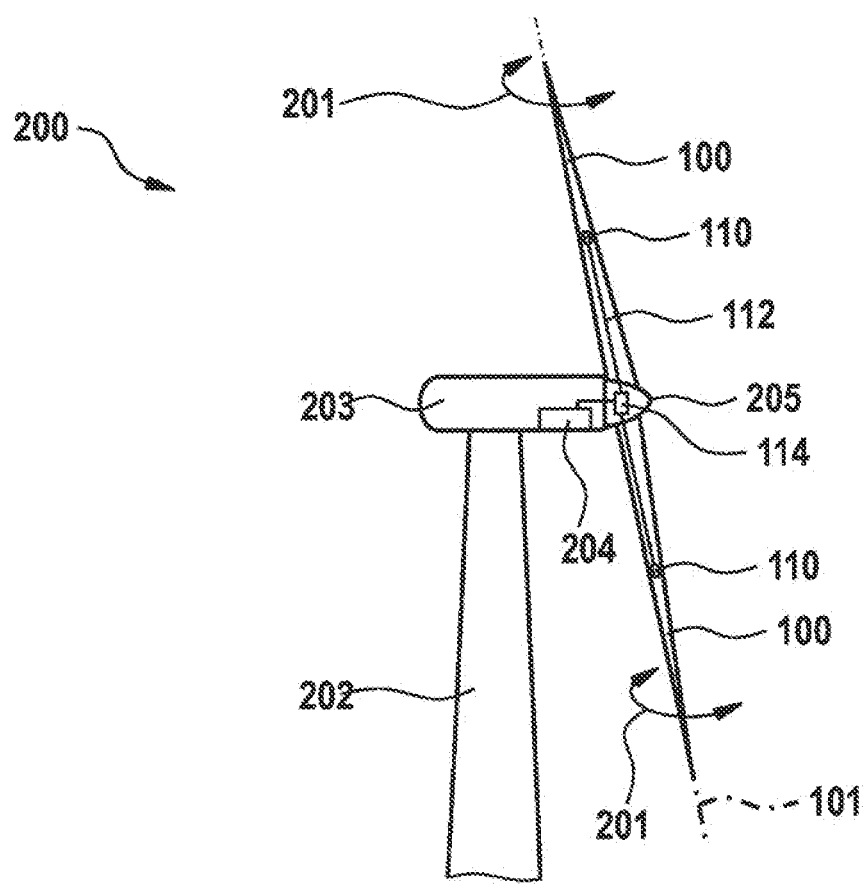
FIG. 4 schematically shows a part of a wind turbine including rotor blades and sensor patches secured thereto.

FIG. 4 shows a wind turbine 200. The wind turbine 200 includes a tower 202 and a nacelle 203. The rotor 500 is attached to the nacelle 203. The rotor 500 includes a hub 205, where the rotor blades 100 are fastened. According to typical embodiments, the rotor 500 has at least two rotor blades, in particular three rotor blades. In the operation of the wind energy plant or wind turbine, the rotor 500, i.e. the hub 205 with the rotor blades 100, rotates about an axis. Thereby, a generator is driven for power generation. In order to employ a sensor patch 110 for instance in a wind turbine, the sensor patch 110 as shown in FIGS. 3A and 3B, for example, may be provided on a rotor blade 100, in particular in an outer radial area thereof. In this case, it is advantageous for the sensor patch 110 to have a small dimension in a cross-section perpendicular to the light guide 112 in FIG. 1. A maximum dimension in a cross-section perpendicular to the axis of the light guide 112 may be 10 mm or less, for example. The configuration as shown with reference to FIG. 1B enables such a dimensioning to be easily realized.

As illustrated in FIG. 4, at least one sensor patch 110 is provided on a rotor blade 100. Via a signal line or a light guide 112, the sensor patch 110 is in communication with an evaluating unit 114. The evaluating unit 114, for instance delivers a signal to a control unit 204 of the wind turbine 200.

Here, for the use in rotor blades of wind turbines or for the methods for monitoring wind turbines, for example, it is particularly beneficial for an elongation and/or compression to be measured in a direction perpendicular to the longitudinal extension of the light guide 112. Wind energy plants are subject to a complex control which may be necessitated by varying operating conditions, for example. In the monitoring of operating states of wind turbines, a plurality of sensors is used. For example, elongation and/or compression measurements on a rotor blade 100 may be performed for measuring the bending of the rotor blade 100.

Due to the conditions linked to the operation of a wind turbine, for example pressure and temperature variations, weather and meteorological conditions, but also in particular strongly changing wind conditions, and due to the multiplicity of statutory safety measures, the monitoring and the sensors required for monitoring are subject to a multiplicity of marginal conditions. A pressure variation might, for instance occur at the rotor blades 100 during operation. Here, an instability along the rotor blade axis 101 might occur which disturbs the operation of the wind turbine and reduces the energy yield. Further, there is the possibility that a change of pressure and thus vibrations or oscillations arise in single rotor blades. This leads to critical operating states in many cases, requiring complex control and/or regulating measures. An elongation and/or compression measurement directly on the rotor blade furthermore enables a setting of a pitch angle to be found that is efficient to the energy yield.

Each rotor blade 100 may have its own individual elongation and/or compression distribution. Therefore, at least one fiber optic sensor 110 is provided in each rotor blade 100 according to certain embodiments which can be combined with other embodiments.

According to some embodiments which can be combined with other embodiments, fiber optic sensors 110, in which a signal is optically transmitted via a light guide 112, enable a radial mounting position, that was hitherto regarded in practice as being unfavorable, along a longitudinal extension of the rotor blade 100, since the transmission by means of a light guide 112 or optical fiber entails a reduced risk of lightning damage. Fiber optic sensors 110 may therefore be provided in such a manner to allow an assembly in an outer radial area 107 of a rotor blade 110 without increasing the risk of lightning damage.

Figure 5:
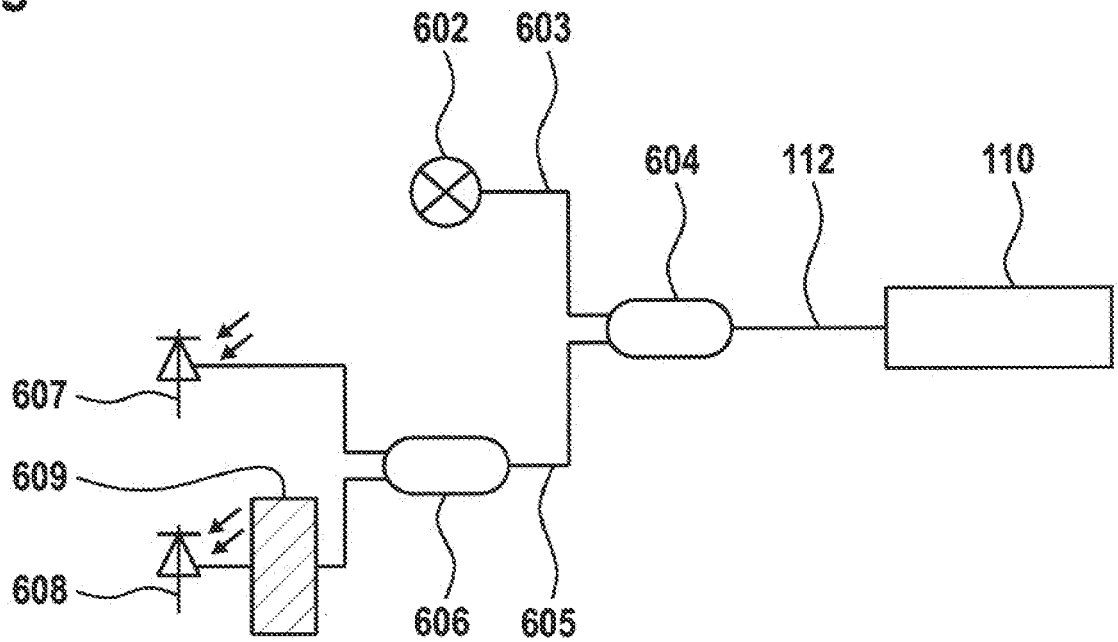
FIG. 5 schematically shows a measuring setup for a sensor patch according to embodiments described herein.

FIG. 5 shows a typical measuring system for the fiber optic elongation and/or compression measurement according to the embodiments described herein. The system includes one or more fiber optic sensors 110. The system includes a source 602 of electromagnetic radiation, for example a primary source of light. The source 602 serves to provide optical radiation by which at least one fiber optic sensor 110 can be irradiated. For this purpose, an optical transmission fiber or a light guide 603 is provided between the primary source of light 602 and a first fiber coupler 604. The fiber coupler 604 couples the primary light into the optical fiber or the light guide 112. The source 602 may be, for instance, a broadband source of light, a laser, an LED (light emitting diode), an SLD (super luminescence diode), an ASE source of light (amplified spontaneous emission source of light) or an SOA (semiconductor optical amplifier). Even a plurality of sources of the same or different type (see above) may be used for the embodiments described here.

The sensor element 111 such as, for example, an optical fiber Bragg grating is optically coupled to the sensor fiber 112. The light reflected from the fiber optic sensors 110 will in turn be guided via the fiber coupler 604, which guides the light via the transmission fiber 605 into a beam splitter 606. The beam splitter 606 splits the reflected light for detection by means of a first detector 607 and a second detector 608. On this occasion, the signal detected on the second detector 608 is firstly filtered by an optical filtering means 609. Due to the filtering means 609, a wavelength distribution of an optical signal output from the sensor element 111 can be analyzed.

Generally, a measuring system as illustrated in FIG. 5 may be provided without the beam splitter 606 or the detector 607. The detector 607, however, enables the measurement signal of the fiber optic sensor 110 to be standardized with respect to other intensity fluctuations such as, for example, fluctuations in the intensity of the source 602, fluctuations by reflections on interfaces between individual light guides, fluctuations by reflection on interfaces between the light guide 112 and the evaluating unit 114, or other intensity fluctuations. This standardization improves the measuring accuracy and reduces during the operation of the measuring system a dependence on the length of the light guide 112 provided between the evaluating unit 114 and the fiber optic sensor 110.

The optical filtering means 609 or additional optical filtering means for filtering the optical reflection signal output from the sensor element 111 may includes an optical filter which is selected from the group consisting of an edge filter, a thin film filter, a fiber Bragg grating, an LPG, an arrayed waveguide grating (AWG), an echelle grating, an array of gratings, a prism, an interferometer, and any combination thereof.

Figure 6:
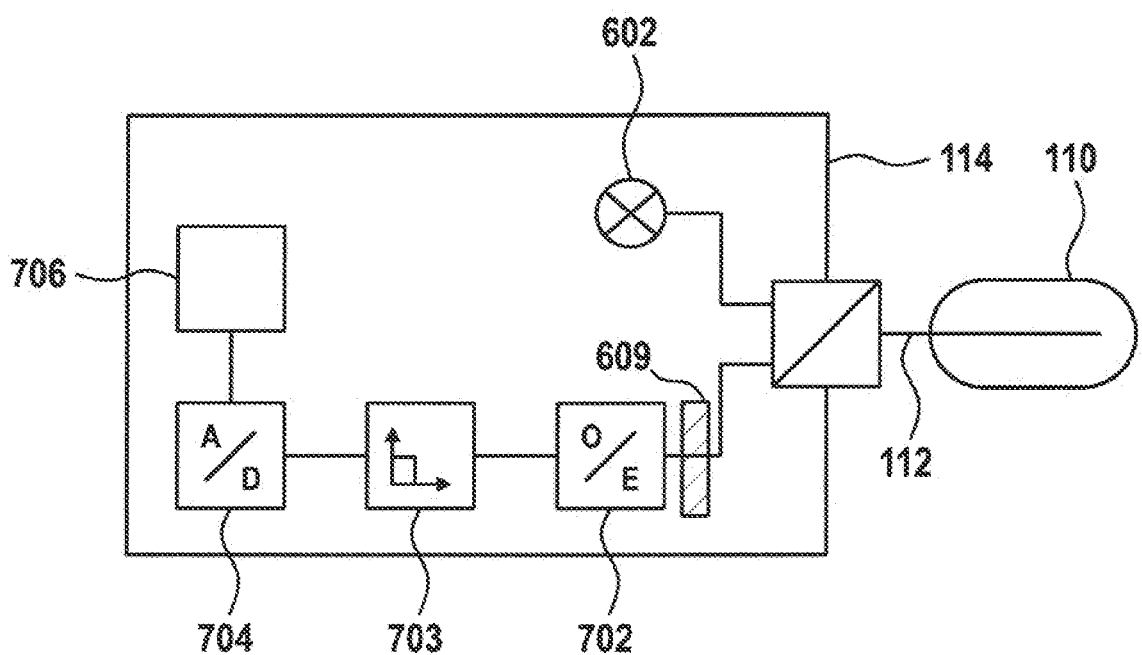
FIG. 6 schematically shows a measuring setup for a sensor patch according to embodiments described herein.

FIG. 6 shows an evaluating unit 114, wherein a signal of a fiber optic sensor 110 is guided via a light guide 112 to the evaluating unit 114. Furthermore, a source of light 602 is illustrated in FIG. 6, which may be optionally provided in the evaluating unit. The source of light 602, however, may even be provided independently or external to the evaluating unit 114. The optical signal of the fiber optic sensor 110 is converted into an electrical signal by a detector, i.e. an opto-electrical converter 702. The electrical signal is filtered by an analog anti-aliasing filter 703. Following the analog filtering by the analog anti-aliasing filter or low-pass filter 703, the signal is digitized by an analog-to-digital converter 704.

According to some embodiments described here which can be combined with other embodiments, the evaluating unit 114 enables elongations and/or compressions of a measurement object, to which the intermediate carrier 500 of the clamping device 300 is mounted, to be identified based on the reflection signal output from the fiber optic sensor element 111. The anti-aliasing filter can have a critical frequency of 1 kHz or below, in particular of 500 Hz or below, furthermore in particular of 100 Hz or below. According to embodiments described here, such a filtering takes place prior to digitizing. According to embodiments described here, an analog low-pass filtering takes place prior to digitizing a signal of a fiber optic sensor 110. According to embodiments described here, which can be combined with other embodiments the low-pass filter may also be referred to as an analog anti-aliasing filter. Hereby, the Nyquist frequency is considered within a sampling theorem, and a low-pass filtering with signal portions smaller than the Nyquist frequency is provided by means of the analog low-pass filter or analog anti-aliasing filter. Based on the embodiments described here including a fiber optic sensor 110 and an analog low-pass filtering, an improved measurement of elongations and/or compressions of a measurement object may be provided. FIG. 6 furthermore shows a digital evaluating unit 706, which may include, for instance, a CPU, memories and other elements for digital data processing.

As explained with respect to FIG. 6, a method for elongation and/or compression detection by means of the fiber optic sensor 110 can be improved. An evaluating unit 114 is provided, for example. The evaluating unit 114 may include a converter for converting the optical signal into an electrical signal. For example, a photodiode, a photomultiplier (PM) or any other opto-electronic detector may be used as the converter. The evaluating unit 114 moreover includes an anti-aliasing filter 703 which is connected to the output of the converter or the opto-electronic detector, for example. The evaluating unit 114 may furthermore include an analog-to-digital converter 704 which is connected to the output of the anti-aliasing filter 703. The evaluating unit 114 may moreover include a digital evaluating unit 706 which is arranged to evaluate the digitized signals.

According to even further embodiments which can be combined with embodiments described herein, a temperature compensation in the fiber optic sensor 110 can be provided such that materials having a very low thermal expansion coefficient are used for the intermediate carrier 500 and/or the fastening elements 301, 302.

According to embodiments, the light guide 112 may, for example, be a glass fiber, an optical fiber or a polymer conductor, wherein materials such as optical polymers, polymethyl methyl acrylate, polycarbonate, quartz glass, ethylene tetrafluoroethylene can be used which are doped, if need be. The optical fiber may in particular be realized as an SMF-28 fiber.

Figure 7:
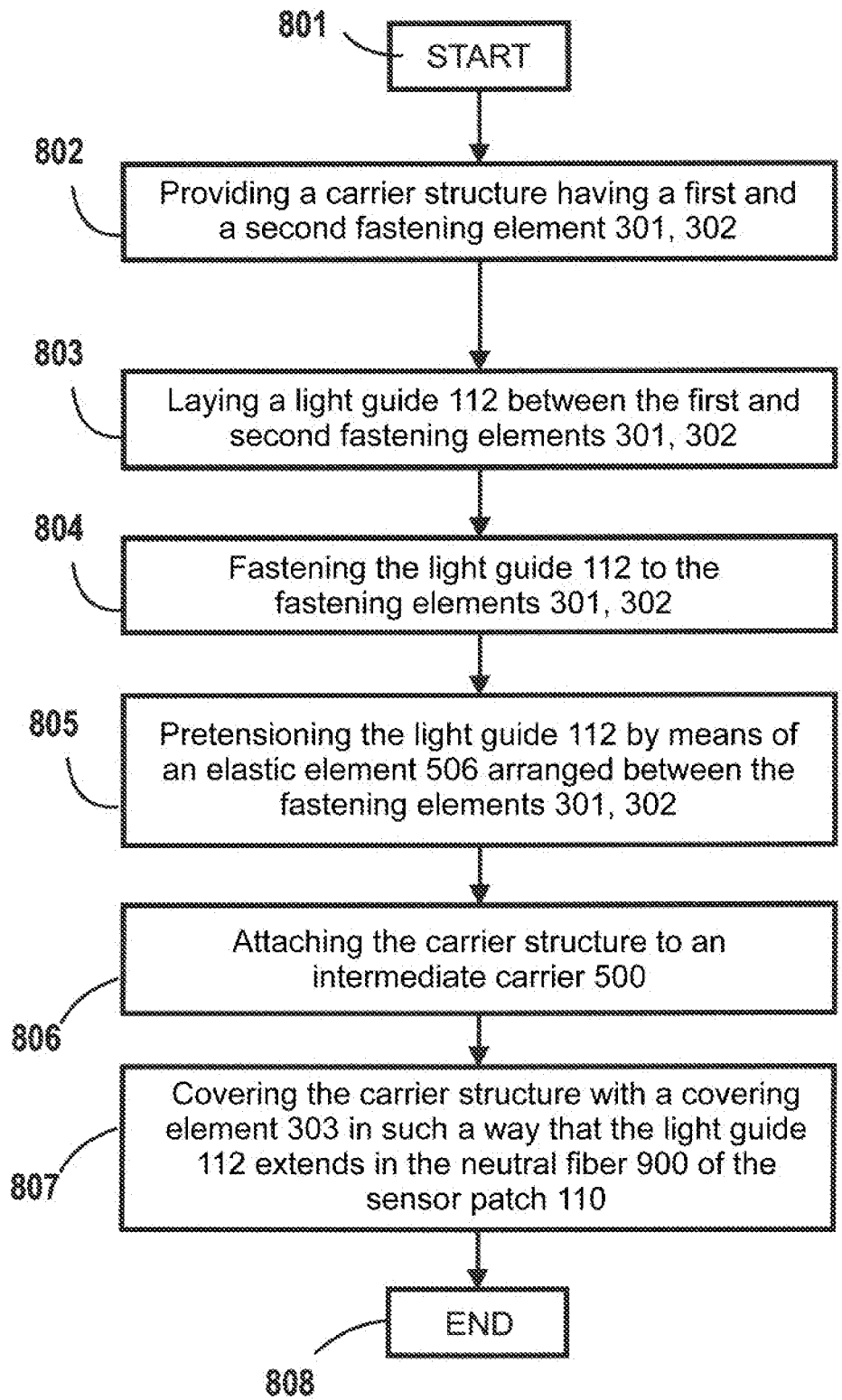
FIG. 7 shows a flow chart for illustrating a method for producing a sensor patch according to embodiments described herein.

FIG. 7 shows a flowchart for illustrating a method for producing a sensor patch 110 according to embodiments described here. In detail, the method for producing the sensor patch 110 includes the following blocks 801 to 808. The production procedure is started in a block 801. Subsequently, in a block 802, a carrier structure having a first and a second fastening element 301, 302 is provided. In a following block 803, a light guide 112 is laid between the first and second fastening elements 301, 302, for example, by inserting it in dedicated grooves on the fastening elements 301, 302. Finally, the light guide 112 is fastened to the fastening elements 301, 302 (block 804). Such a fastening of the light guide 112 to the fastening elements 301, 302 may include adhesively bonding the light guide 112 to the fastening elements 301, 302.

The light guide 112 can now be pretensioned by means of an elastic element 506 arranged between the fastening elements 301, 302, see block 805. Finally, in block 806, the carrier structure is mounted to an intermediate carrier 500. To produce the complete sensor patch structure, the carrier structure is covered with a covering element 303 in a block 807 such that the light guide 112 extends in the neutral fiber 900 of the sensor patch 110. It should, however be pointed out that the operation of covering the carrier structure with a covering element 303 such that the light guide 112 extends in the neutral fiber 900 of the sensor patch 110 is based on the fact that a mechanically rigid connection between the intermediate carrier 500 and the covering element 303 is provided, for instance by one or more connecting elements 404, 405, 406. Finally, the production procedure is ended in block 808.

According to an embodiment which can be combined with other embodiments described herein, the carrier structure, the intermediate carrier 500 and the covering element 303 may be adhesively bonded with the light guide 112 as a unit.

A fiber optic sensor 110 for measuring elongations and/or compressions of a measurement object to be monitored is thus provided. The sensor 110 includes a light guide 112 with a fiber Bragg grating 111, wherein the light guide 112 is clamped in a clamping device 300. The clamping device 300, in turn, includes a carrier structure having a first fastening element 301 for fastening the light guide 112 at a first position 401 and a second fastening element 302 at a distance from the first fastening element 301 for fastening the light guide 112 at a second position 402, wherein the first and second positions 401, 402 have a first distance 403 in a longitudinal extension of the light guide 112. Furthermore, an intermediate carrier 500 is provided having a first surface 503, on which the first and second fastening elements 301, 302 are attached at respective fastening positions 501, 502, and having an opposing second surface 504, which can be applied to a measurement object. In this case, a second distance 505 of the fastening positions 501, 502 of the fastening elements 301, 302 on the intermediate carrier 500 is greater than the first distance 403 in the longitudinal direction of the light guide 112.

Further applications of the fiber optic sensor 110 exist in the field of vibration measurement. By detecting elongations and compressions, for example, airborne vibrations and structure-borne vibrations become detectable. Such vibrations, that can be detected by the fiber optic sensor 110 according to embodiments described herein, can have frequencies in a range of 1 kHz or higher, typically in a range of 5 kHz or higher.

Although the present invention has been described above on the basis of typical embodiments, it is not restricted thereto, but can be modified in manifold ways. The invention is neither restricted to the mentioned possible applications.

The invention claimed is:

1. Sensor patch, comprising:
a light guide having at least one fiber optic sensor element;
a carrier structure having:
a first fastening element for fastening the light guide at a first position;
and a second fastening element that is spaced apart from the first fastening element for fastening the light guide at a second position, wherein the fiber optic sensor element is arranged between the first position and the second position;
an intermediate carrier having a first surface, on which the first and second fastening elements are mounted at respective fastening positions, and an opposing second surface that can be mounted on a measurement object;
and a covering element arranged on the intermediate carrier and connected thereto, which together with the intermediate carrier has a cross-sectional dimension, which is oriented approximately perpendicular to a longitudinal extension of the light guide, in such a way that the light guide extends in the neutral fiber of the sensor patch, which has neither tensile nor compressive stresses when bent,
wherein a connecting element has a cavity in which the carrier structure is arranged.

2. Sensor patch according to claim 1, further comprising at least one connecting element for mechanically connecting the covering element and the intermediate carrier.

3. Sensor patch according to claim 1, wherein the intermediate carrier, the carrier structure, the connecting element and the covering element form a monolithic unit.

4. Sensor patch according to claim 1, wherein a thickness (D) of the covering element and/or a distance (A) of the covering element from the intermediate carrier and/or the material property of the covering element and/or of the intermediate carrier and/or of the connecting element are selected such that the light guide extends in the neutral fiber of the sensor patch.

5. Sensor patch according to claim 1, wherein the first and second positions have a first distance in a longitudinal extension of the light guide, wherein a second distance of the fastening positions of the fastening elements on the intermediate carrier is greater than the first distance in a longitudinal direction of the light guide.

6. Sensor patch according to claim 5, wherein the fastening elements together with the intermediate carrier form a converter structure having a mechanical signal amplification arrangement without any lever action, which is configured in such a manner that a relative change in the first distance applied to the sensor element is greater than a relative change in the second distance applied to the intermediate carrier.

7. Sensor patch according to claim 1, wherein the first and/or second distances and/or the thermal expansion coefficients of the carrier structure and of the intermediate carrier are configured such that a passive temperature compensation of the fiber optic sensor element fastened to the carrier structure is provided.

8. Sensor patch according to claim 1, wherein the at least one fiber optic sensor element is formed as a fiber Bragg grating.

9. Sensor patch according to claim 1, wherein the carrier structure is realized in one piece.

10. Sensor patch according to claim 1, wherein the carrier structure contains a material selected from the group consisting of GFRP, steel, aluminum, an alloy, CFRP and any combination thereof.

11. Sensor patch, comprising:
a light guide having at least one fiber optic sensor element;
a carrier structure having:
a first fastening element for fastening the light guide at a first position;
and a second fastening element that is spaced apart from the first fastening element for fastening the light guide at a second position, wherein the fiber optic sensor element is arranged between the first position and the second position;
an intermediate carrier having a first surface, on which the first and second fastening elements are mounted at respective fastening positions, and an opposing second surface that can be mounted on a measurement object;
and a covering element arranged on the intermediate carrier and connected thereto, which together with the intermediate carrier has a cross-sectional dimension, which is oriented approximately perpendicular to a longitudinal extension of the light guide, in such a way that the light guide extends in the neutral fiber of the sensor patch, which has neither tensile nor compressive stresses when bent,
wherein the covering element is realized from an elastic material selected from the group consisting of rubber, GFRP, plastics, CFRP and any combination thereof.

12. Sensor patch, comprising:
a light guide having at least one fiber optic sensor element;
a carrier structure having:
a first fastening element for fastening the light guide at a first position;
and a second fastening element that is spaced apart from the first fastening element for fastening the light guide at a second position, wherein the fiber optic sensor element is arranged between the first position and the second position;
an intermediate carrier having a first surface, on which the first and second fastening elements are mounted at respective fastening positions, and an opposing second surface that can be mounted on a measurement object;
and a covering element arranged on the intermediate carrier and connected thereto, which together with the intermediate carrier has a cross-sectional dimension, which is oriented approximately perpendicular to a longitudinal extension of the light guide, in such a way that the light guide extends in the neutral fiber of the sensor patch, which has neither tensile nor compressive stresses when bent,
wherein the light guide is bonded into a recess of the fastening element.

13. Sensor patch, comprising:
a light guide having at least one fiber optic sensor element;
a carrier structure having:
a first fastening element for fastening the light guide at a first position;
and a second fastening element that is spaced apart from the first fastening element for fastening the light guide at a second position, wherein the fiber optic sensor element is arranged between the first position and the second position;
an intermediate carrier having a first surface, on which the first and second fastening elements are mounted at respective fastening positions, and an opposing second surface that can be mounted on a measurement object;
and a covering element arranged on the intermediate carrier and connected thereto, which together with the intermediate carrier has a cross-sectional dimension, which is oriented approximately perpendicular to a longitudinal extension of the light guide, in such a way that the light guide extends in the neutral fiber of the sensor patch, which has neither tensile nor compressive stresses when bent,
wherein the carrier structure further comprises at least one elastic element arranged between the first and second fastening elements and configured to pretension a light guide in the longitudinal direction that is fastened to the fastening elements.

14. Method for producing a sensor patch, comprising:
providing a carrier structure having a first and a second fastening element;
laying a light guide between the first and second fastening elements;
fastening the light guide to the fastening elements;
pretensioning the light guide by means of an elastic element arranged between the fastening elements;
attaching the carrier structure to an intermediate carrier; and
covering the carrier structure with a covering element in such a way that the light guide extends in the neutral fiber of the sensor patch.

15. Method according to claim 14, wherein the light guide is adhesively bonded with the fastening elements.

16. Method according to claim 14, wherein a thermal expansion of the intermediate carrier is at least in part compensated by a thermal expansion of the carrier structure.

17. Method according to claim 14, wherein the carrier structure, the intermediate carrier and the covering element together with the light guide are adhesively bonded as a unit.

\* \* \* \* \*